United States Patent [19]

Takeda et al.

[11] Patent Number: 4,929,655
[45] Date of Patent: May 29, 1990

[54] PROCESS FOR PRODUCTION OF WATER-SOLUBLE POLYMER DISPERSION

[75] Inventors: Hisao Takeda, Zama; Mutsumi Kawano, Chigasaki, both of Japan

[73] Assignee: Kyoritsu Yuki Co., Ltd., Japan

[21] Appl. No.: 286,976

[22] Filed: Dec. 20, 1988

Related U.S. Application Data

[63] Continuation-in-part of Ser. No. 798,739, Nov. 15, 1985, abandoned.

[30] Foreign Application Priority Data

Nov. 19, 1984 [JP] Japan ................. 59-244152
Jul. 18, 1985 [JP] Japan ................. 60-158709
Jul. 18, 1985 [JP] Japan ................. 60-158711

[51] Int. Cl.$^5$ ............................... C08F 2/16
[52] U.S. Cl. .................... 524/458; 524/460
[58] Field of Search ................. 524/458, 460

[56] References Cited

U.S. PATENT DOCUMENTS 4,380,600  4/1983  Hosoda et al. ................. 524/458

*Primary Examiner*—Joseph L. Schofer
*Assistant Examiner*—J. M. Reddick
*Attorney, Agent, or Firm*—Ostrolenk, Faber, Gerb & Soffen

[57] ABSTRACT

A process for preparing a water-soluble polymer dispersion is here provided which is characterized by polymerizing water-soluble monomers of 5 to 1000 mole % of a cationic monomer represented by formula (I) defined herein, 0 to 50 mole % of another cationic monomer represented by formula (II) defined herein and 0 to 95 mole % of (meth)acrylamide in the presence of 1 to 10% by weight of an organic high-molecular multivalent cation based on the total weight of the monomers in a multivalent anionic salt aqueous solution having a concentration of 15% by weight or more.

8 Claims, No Drawings

PROCESS FOR PRODUCTION OF WATER-SOLUBLE POLYMER DISPERSION

This is a continuation-in-part of application Ser. No. 798,739 filed Nov. 15, 1985, now abandoned.

BACKGROUND OF THE INVENTION

(1) Field of the Invention

The present invention relates to a process for the production of a dispersion of a water-soluble polymer, which is widely used as, e.g., flocculating agents for waste water treatment, dehydrating agents, chemicals for paper making used in a paper making process, dispersion stabilizers for various suspensions, soil improvers etc.

(2) Description of the Prior Art

Heretofore, as processes for the production of water-soluble polymers used in such a field of the invention as those described above, there are stationary polymerization in an aqueous solution, water-in-oil type emulsion polymerization (Japanese Patent application Laid-Open No. 102388/1979), suspension polymerization in a hydrophobic solvent (Japanese Patent application Laid-Open No. 69196/1979), etc.

Furthermore, for precipitation polymerization in a salt aqueous solution, Japanese Patent application Laid-Open No. 70489/1975 has been disclosed, and for polymerization in a salt aqueous solution mainly comprising acrylic acid at a low pH, Japanese Patent Publication No. 14907/1971 has been disclosed.

In addition, in the U.S. Pat. No. 4,380,600, there is disclosed a process for preparing a water-soluble polymer dispersion by precipitation polymerization in the presence of a water-soluble polymer as a precipitating medium.

In the stationary polymerization in an aqueous solution, since the polymerization is conducted at a monomer concentration of 10% by weight or higher in order to obtain a polymer of a high molecular weight, the product is in a hydrated gel form and hence cannot be easily dissolved as such and therefore it is necessary either to dilute and put it on the market as a flowable, low concentration product or to dry it to a powder. Where it is intended to put on the market a low concentration polymer, it has a drawback that the transport cost is increased, whereas when made into a powder, the heat energy required for drying is great, and also there is a drawback that by heating, a three-dimentional crosslinking is brought about and a water-insoluble part is generated.

The water-in-oil type emulsion is flammable and further has the drawback that valuable organic solvents are wastefully consumed; and with the suspension polymerization in a hydrophobic solvent, since flammable substances such as cyclohexane, toluene etc. are used, there is the drawback that an enormous cost is required for the production apparatus.

Although the precipitation polymerization in a salt aqueous solution is low in the equipment cost and is a good process, it has a drawback that the formed polymer particles tend to stick to each other and grow into a bigger mass and thus handling becomes very difficult.

In the invention described in Japanese Patent Publication No. 14907/1971, the dispersion is stable only under acidic conditions, and when the carboxyl groups are dissociated, it turns to a gel. However, since an anionic flocculating agent generally manifests an effect by dissociating the carboxyl groups and extending the polymer chain, the acidic flocculating agent does not manifest a satisfactory effect if not neutralized upon use except in the case where it is used in an alkaline solution at a high pH. Furthermore, it is difficult for this process to produce a polymer flocculating agent having a degree of anionization of 15 mole % or less which is most effective as a flocculating agent.

In the invention disclosed in U.S. Pat. No. 4,380,600, it is necessary to use a great deal of the expensive depositing polymer so as to insolubilize the desired water-soluble polymer, since the precipitation effect of the depositing polymer is poor.

SUMMARY OF THE INVENTION

The present invention is directed to a method for preparing a water-soluble cationic polymer dispersion. The present invention is characterized by dispersing, in a multivalent anionic salt aqueous solution, fine particles of a water-soluble cationic polymer which is insoluble in the salt aqueous solution.

It is essential that the water-soluble cationic polymer which is insoluble in the above-mentioned salt aqueous solution has specific composition and contains a structural unit comprising a dialkylbenzylammonium salt. The fine particles of the water-soluble cationic polymer may be characteristically obtained by performing polymerization in the multivalent anionic salt aqueous solution in the presence of 1 to 10% by weight of a dispersant comprising an organic high molecular multivalent cation with respect to the total weight of monomers.

The multivalent anionic salt aqueous solution is used for the purpose of insolubilizing and depositing the polymer prepared by the polymerization. The dispersant is used for the purpose of imparting an electric charge to the deposited polymer to prevent the particles from enlarging and thus the deposited particles are kept to be the fine particles.

DETAILED DESCRIPTION OF THE INVENTION

The object of the present invention is to provide a method for dispersing fine particles of a water-soluble cation polymer in a salt aqueous solution. According to the present invention, the above-mentioned object can be achieved by dissolving water-soluble monomers which will be described hereinafter and a dispersant comprising an organic high-molecular multivalent cation in a multivalent anionic salt aqueous solution, and then performing polymerization with agitation.

The water-soluble monomers used in the present invention are 5 to 100 mole % of a cationic monomer represented by the following formula (I), 0 to 50 mole % of a cationic monomer represented by the following formula (II) and 0 to 95 mole % of (meth)acrylamide:

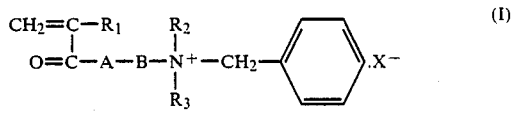

wherein $R_1$ is H or $CH_3$; each of $R_2$ and $R_3$ is an alkyl group having 1 to 3 carbon atoms; A is an oxygen atom or NH; B is an alkylene group of 2 to 4 carbon atoms or a hydro-oxypropylene group; and $X^-$ is anionic counterion,

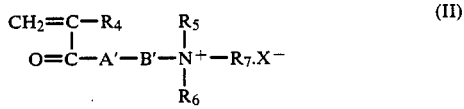

(II)

wherein $R_4$ is H or $CH_3$; each of $R_5$ and $R_6$ is an alkyl group having 1 to 2 carbon atoms; $R_7$ is H or an alkyl group of 1 to 2 carbon atoms; A' is an oxygen atom or NH; B' is an alkylene group of 2 to 4 carbon atoms or a hydroxypropylene group; and $X^-$ is an anionic counterion.

The salting out of the polymer depends upon the functional group of the polymer. The structural unit (monomer) represented by the formula (I) can be most easily salted out, and the (meth)acrylamide structural unit (monomer) can be next easily done, and the structural unit represented by the formula (II) is difficult to salt out. For this reason, in the case that the monomer having the formula (II) takes part in copolymerization, the amount of the monomer of the formula (I) must be increased, practically the mole amount of the formula (I) should be not less than that of the monomer of the formula (II). Examples of the monomer represented by the formula (I) include quaternary monomers obtained by treating dimethylaminoethyl (meth)acrylate, diethylaminoethyl (meth)acrylate, dimethylaminopropyl (meth)acrylamide, diethylaminopropyl (meth)acrylamide and dimethylaminohydroxylpropyl (meth)acrylate with benzyl chloride.

Examples of the monomer represented by the formula (II) include salts such as dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate, and methylated and ethylated quaternary salts.

The concentration of the above-mentioned monomers in the polymerization reaction mixture is suitably in the range of 5 to 30% by weight.

The multivalent anionic salt used to deposit the polymer in the present invention is a sulfate or a phosphate, and typical examples of these salts include ammonium sulfate, sodium sulfate, magnesium sulfate, aluminum sulfate, ammonium hydrogenphosphate, sodium hydrogenphosphate and potassium hydrogenphosphate. The salt is used in the form of a salt aqueous solution at a concentration of 15% or more, preferably 20% by weight or more. When the concentration of the salt solution is less than 15% by weight, the polymer is melted and consequently takes the state of a viscous aqueous polymer solution.

Next, reference will be made to the dispersant which is the essential material in the constitution of the present invention.

The dispersant used in the present invention comprises the organic high-molecular multivalent cation which is soluble in the above-mentioned salt aqueous solution, and it is used in an amount of 1 to 10% by weight based on the total weight of the monomers. This dispersant has no effect of depositing the polymer.

The organic high-molecular multivalent cation constituting the dispersant is composed of 20 mole % or more of the cationic monomer unit represented by the formula (II) and the residual mole % is (meth)acrylamide. The performance of the dispersant is not greatly affected by molecular weight, but the molecular weight of the usable dispersant is in the range of 10,000 to 10,000,000. Nevertheless, since the dispersant is usually subjected to a nitrogen aeration treatment after dissolved in the salt aqueous solution together with the monomers, it is operatively convenient to make use of the dispersant having a molecular weight in the range of 10,000 to 100,000. The dispersant is added thereto in an amount of 1 to 10% by weight based on the total weight of the monomers. When the content of the dispersant is less than 1% by weight, no dispersion effect can be expected, and when it is in excess of 10% by weight, the amount is economically meaningless and the viscosity of the monomer solution rises, which is liable to lead to the shortage of the nitrogen aeration. When a multivalent alcohol such as glycerin or polyethylene glycol is coexistent in the polymerization system, the deposition of the fine particles can be more smoothly carried out at times. For the polymerization, a usual water-soluble radical-forming agent can be employed, but above all, water-soluble azo compounds such as 2,2'-azobis(2-amidinopropane) hydrochloride and 2,2'-azobis(N,N'-dimethyleneisobutylamine) hydrochloride are particularly preferable.

(EXAMPLES)

This invention is more particularly described by the following examples, but it should be understood that the present invention is not limited to these examples unless it departs from the scope of the invention.

EXAMPLE 1

In a 1-liter five-necked separation flask equipped with a stirrer, thermometer, reflux condenser and nitrogen inlet tube were placed 2.5 g of a homopolymer of acryloyloxyethyltrimethylammonium chloride as dispersant, 112.5 g of ammonium sulfate and 335 g of deionized water, to form a solution. Afterward, 35.1 g (90 mole %) of acrylamide and 14.9 g (10 mole %) of acryloyloxyethyldimethylbenzylammonium chloride were added thereto. Heating was then effected up to 50° C., and the atmosphere in the flask was replaced with nitrogen.

One gram of a 1% aqueous solution of 2,2'-azobis(2-amidinopropane) hydrochloride was added thereto as a polymerization initiator, and polymerization was conducted with stirring at 50° C. for 10 hours to obtain a polymer in the form of fine particles dispersed in the salt aqueous solution.

The viscosity of this product was 500 cp at 25° C., and the viscosity of the 0.5% polymer in a 1 N sodium chloride aqueous solution was 22.0 cp.

EXAMPLE 2

In the flask used in Example 1 were placed 3.8 g of a copolymer obtained by polymerizing acrylamide and acryloyloxyethyltrimethylammonium chloride at a molar ratio of 75:25 as dispersant, 42.5 g of aluminum sulfate, 42.5 g of sodium sulfate and 336.2 g of deionized water, to form a solution. Afterward, 52.7 g (90 mole %) of acrylamide and 22.3 g (10 mole %) of acryloyloxyethyldimethylbenzylammonium chloride were added thereto, the flask contents were heated up to 50° C. and the atmosphere in the flask was replaced with nitrogen.

To the mixture was added 1.5 g of a 1% aqueous solution of 2,2'-azobis(2-amidinopropane) hydrochloride, and polymerization was conducted with stirring at 50° C. for 10 hours to obtain a polymer in the form of fine particles dispersed in the salt aqueous solution.

The viscosity of this product was 2,400 cp at 25° C., and the viscosity of the 0.5% polymer in a 1 N sodium chloride aqueous solution was 32.0 cp.

EXAMPLE 3

In a 1-liter five-necked separation flask equipped with a stirrer, thermometer, reflux condenser, nitrogen inlet tube and dropping funnel were placed 1.3 g of a homopolymer of methacryloyloxyethyltrimethylammonium chloride as dispersant, 90 g of sodium sulfate and 318.7 g of deionized water, and they were then dissolved to form a solution. Afterward, the flask was heated up to 50° C., and the atmosphere in the flask was then replaced with nitrogen. Next, a mixture obtained by mixing and dissolving 34.6 g (90 mole %) of acrylamide, 15.4 g (10 mole %) of methyacryloyloxyethyldimethylbenzylammonium chloride, 40 g of deionized water and 0.05 g of 2,2'-azobis(2-amidinopropane) hydrochloride was put into the dropping funnel and gradually added dropwise to the salt aqueous solution with stirring. By polymerization at 50° C. for 10 hours, a polymer was obtained in the form of fine particles dispersed in the salt aqueous solution.

The viscosity of this product was 1,080 cp at 25° C., and the viscosity of the 0.5% polymer in 1 N sodium chloride aqueous solution was 20.0 cp.

EXAMPLE 4

In the flask used in Example 1 were placed 3.8 g of a copolymer obtained by polymerizing acrylamide and methacryloyloxyethyltrimethylammonium chloride at a molar ratio of 50:50 as dispersant, 127.5 g of ammonium sulfate and 293.7 g of deionized water and they dissolved to form a solution. Afterward, 30.0 g (70 mole %) of acrylamide, 12.4 g (10 mole %) of dimethylaminoethyl methacrylate sulfate and 32.6 g (20 mole %) of acryloyloxyethyldimethylbenzylammonium chloride were added thereto, heating was then applied up to 40° C. and the atmosphere in the flask was replaced with nitrogen.

Next, 0.38 g of a 10% aqueous solution of ammonium persulfate and 0.38 g of a 10% aqueous solution of sodium hydrogensulfite were added thereto, and polymerization was conducted with stirring at 40° C. for 10 hours to obtain a polymer in the form of fine particles dispersed in the salt aqueous solution.

The viscosity of this product was 2,820 cp at 25° C., and the viscosity of the 0.5% polymer in a 1 N sodium sulfate aqueous solution was 17.0 cp.

EXAMPLE 5

In the flask used in Example 1 were placed 400 g of deionized water, 110 g of ammonium sulfate, 34.4 g (65 mole %) of acrylamide, 23.3 g (15 mole %) of acrylamidopropyltrimethylammonium chloride and 42.3 g (20 mole %) of acrylamidopropyldimethylbenzylammonium chloride to form a solution. Afterward, to the solution was added 10 g of a copolymer comprising 25 mole % of acrylamidopropyltrimethylammonium chloride and 75 mole % of acrylamide as dispersant. After dissolution, the contents were heated up to 50° C., and the atmosphere in the flask was replaced with nitrogen.

Afterward, 1.0 g of a 10% 2,2'-azobis(2-amidinopropane) hydrochloride aqueous solution was added thereto, and polymerization was then performed with stirring at 50° C. for 10 hours, thereby obtaining fine particles of a polymer dispersed in the salt aqueous solution.

The viscosity of this dispersion was 2,900 cp, and when 90 g of ammonium sulfate was further mixed with the dispersion, the viscosity of this dispersion was 380 cp. The viscosity of the 0.5% polymer in a 1 N sodium sulfate aqueous solution was 58 cp.

EXAMPLE 6

In the flask used in Example 1 were placed 6.3 g of a homopolymer of acryloyloxyethyltrimethylammonium chloride as dispersant, 131.3 g of ammonium sulfate and 237.4 g of deionized water, forming a solution. Afterward, 54.4 g (50 mole %) of methacryloyloxyethyltrimethylammonium chloride and 70.6 g (50 mole %) of acryloyloxyethyldimethylbenzylammonium chloride were added thereto, heating was then done up to 50° C. and the atmosphere in the flask was replaced with nitrogen.

Afterward, 1.3 g of a 10% aqueous solution of 2,2'-azobis(2-amidinopropane) hydrochloride was added thereto, and polymerization was conducted with stirring at 50° C. for 10 hours to obtain a polymer in the form of fine particles dispersed in the salt aqueous solution.

The viscosity of this product was 2,120 cp at 25° C., and the viscosity of the 0.5% polymer in a 1 N sodium sulfate aqueous solution was 10.3 cp.

EXAMPLE 7

In the flask used in Example 1 were placed 5.0 g of a homopolymer of methacryloyloxyethyltrimethylammonium chloride as dispersant, 100 g of magnesium sulfate and 295 g of deionized water. Afterward, 100 g of methacryloyloxyethyldimethylbenzylammonium chloride was added to the solution, heating was then effected up to 50° C. and the atmospshere in the flask was replaced with nitrogen.

Next, 1.0 g of a 10% aqueous solution of 2,2'-azobis(2-amidinopropane) hydrochloride was added thereto, and polymerization was conducted with stirring at 50° C. for 10 hours to obtain a polymer in the form of fine particles dispersed in the salt aqueous solution.

The viscosity of this product was 1,080 cp at 25° C., and the viscosity of the 0.5% polymer in a 1 N sodium sulfate aqueous solution was 14.0 cp.

EXAMPLE 8

In the flask used in Example 3 were placed 8.8 g of a copolymer obtained by polymerizing acrylamide and acryloyloxyethyltrimethylammonium chloride at a molar ratio of 40:60 as dispersant, 113.8 g of sodium dihydrogenphosphate and 158.6 g of deionized water. Afterward, the solution formed was heated up to 50° C., and the atmosphere in the flask was then replaced with nitrogen. Next, a mixture obtained by mixing and dissolving 175 g of acryloyloxyethyldimethylbenzylammonium chloride, 43.8 g of deionized water and 0.18 g of 2,2'-azobis(2-amidinopropane) hydrochloride was put in a dropping funnel and gradually added dropwise to the salt aqueous solution with stirring. Polymerization was then conducted at 50° C. for 10 hours to obtain a polymer in the form of fine particles dispersed in the salt aqueous solution.

The viscosity of this product was 460 cp at 25° C., and the viscosity of the 0.5% polymer in a 1 N sodium sulfate aqueous solution was 13.5 cp.

EXAMPLE 9

In the flask used in Example 1 were placed 10 g of a homopolymer of methacrylamidopropyltrimethylammonium chloride as dispersant, 120 g of ammonium sulfate and 270 g of deionized water. Afterward, 100 g of acrylamidopropyldimethylbenzylammonium chloride was added to the solution which was heated up to 50° C. and the atmosphere in the flask was replaced with nitrogen.

Next, 1.0 g of a 10% aqueous solution of 2,2'-azobis(-2amidinopropane) hydrochloride was added thereto, and polymerization was conducted with stirring at 50° C. for 10 hours to obtain a polymer in the form of fine particles dispersed in the salt aqueous solution.

The viscosity of this product was 960 cp at 25° C., and the viscosity of the 0.5% polymer in a 1 N sodium sulfate aqueous solution was 15.0 cp.

COMPARATIVE EXAMPLE 1

In the flask used in Example 1 were placed 112.5 g of ammonium sulfate and 337.5 g of deionized water, to form a solution. Afterward, 35.1 g (90 mole %) of acrylamide and 14.9 g (10 mole %) of acryloyloxyethyldimethylbenzylammonium chloride were added thereto, the flask was heated up to 50° C. and atmosphere in the flask was replaced with nitrogen.

Next, 1.0 g of a 1% aqueous solution of 2,2'-azobis(-2amidinopropane) hydrochloride was added thereto, and polymerization was conducted with stirring at 50° C. for 10 hours to obtain a polymer in the form of dispersed particles having a particle diameter of 2 to 3 mm. However, after one night's standing, the dispersed particles of the polymer stuck to each other to grow into a mass and did not disperse again. The reason is that the dispersant used in Example 1 was not used herein.

COMPARATIVE EXAMPLE 2

In the flask used in Example 1 were placed 335 g of deionized water and 2.5 g of a homopolymer of acryloyloxyethyltrimethylammonium chloride as dispersant. Afterward, to the solution mixture were added 35.1 g (90 mole %) of acrylamide and 14.9 g (10 mole %) of acryloyloxyethyldimethylbenzylammonium chloride, heating was applied up to 50° C. and the atmosphere in the flask was replaced with nitrogen. Next, 1 g of a 2,2'-azobis(2 amidinopropane) hydrochloride aqueous solution was added thereto as a polymerization initiator, and polymerization was then performed. At this time, instead of the deposition of a polymer, a transparent mass was formed.

EXAMPLE 10

With regard to the products of the present invention prepared in the above-mentioned examples and a commercially available powdery product, times necessary to completely dissolve in water were measured and compared.

The dissolution was conducted by a magnetic stirrer to make an aqueous solution of 0.2% of the polymer. The results are set forth in Table 1.

TABLE 1

| Product Name | Conc. of Polymer | Viscosity[1] of Solution | Time Necessary for Dissolution |
|---|---|---|---|
| Example 1 | 10% | 22.0 cp | 20 min |
| Example 2 | 15% | 32.0 cp | 20 min |
| Example 3 | 10% | 20.0 cp | 20 min |

TABLE 1-continued

| Product Name | Conc. of Polymer | Viscosity[1] of Solution | Time Necessary for Dissolution |
|---|---|---|---|
| Powdery Product[2] | 95% | 20.0 cp | 60 min |

[1]The solution viscosity was a viscosity of the 0.5% polymer in the 1 N sodium chloride aqueous solution.
[2]The monomer composition of the powdery product was the same as in Examples 1 and 2.

Thus, it was found that the products regarding the present invention could be dissolved more rapidly as compared with the commercial powdery product.

What is claimed is:

1. A process for the production of a water-soluble polymer dispersion which is characterized by polymerizing water-soluble monomers of 5 to 100 mole % of a cationic monomer represented by the following formula (I), 0 to 50 mole % of another cationic monomer represented by the following formula (II) and 0 to 95 mole % of (meth)acrylamide in the presence of 1 to 10% by weight of an organic high-molecular multivalent cation comprising a water soluble polymer containing at least a monomer of formula (II) based on the total weight of the monomers in a multivalent anionic salt aqueous solution having a concentration of 15% by weight or more:

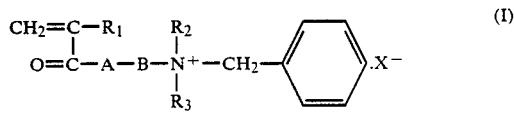
(I)

wherein $R_1$ is H or $CH_3$; each of $R_2$ and $R_3$ is an alkyl group having 1 to 3 carbon atoms; A is an oxygen atom or NH; B is an alkylene group having 2 to 4 carbon atoms or a hydroxypropylene group; and $X^-$ is an anionic counterion,

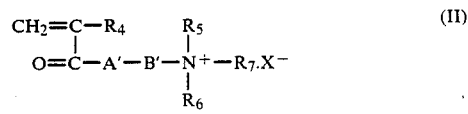
(II)

wherein $R_4$ is H or $CH_3$; each of $R_5$ and $R_6$ is an alkyl group having 1 or 2 carbon atoms; $R_7$ is H or an alkyl group having 1 or 2 carbon atoms; A' is an oxygen atom or NH; B' is an alkylene group having 2 to 4 carbon atoms or a hydroxypropylene group; and $X^-$ is an anionic counterion.

2. A process for the production of a water-soluble polymer dispersion according to claim 1 wherein the multivalent anionic salt comprises a phosphate, a sulfate or mixture thereof.

3. A process for the production of a water-soluble polymer dispersion according to claim 1 wherein the organic high-molecular multivalent cation is a polymerization product of water-soluble monomers comprising 20 to 100 mole % of the cationic monomer represented by the formula (II) and 80 to 0 mole % of (meth)acrylamide.

4. A process for the production of a water-soluble polymer dispersion according to claim 1 wherein the cationic monomer represented by the formula (II) is (meth)acryloyloxyethyltrimethylammonium chloride.

5. A process for the production of a water-soluble polymer dispersion according to claim 1 wherein the cationic monomer represented by the formula (I) is (meth)acryloyloxyethyldimethylbenzylammonium chloride.

6. A process for the production of a water-soluble polymer dispersion according to claim 1 wherein the molar amount of the cationic monomer represented by the formula (I) is not less than that of the cationic monomer represented by the formula (II).

7. A process for the production of a water-soluble polymer dispersion according to claim 1 wherein the organic high-molecular multivant cation is a polymerization product of water-soluble monomers comprising 20 to 100 mole % of (meth)acryloyloxyethyltrimethylammonium chloride and 80 to 0 mole % of (meth)acrylamide.

8. A process according to claim 1 wherein the water-soluble polymer dispersion is a polymerization product of water-soluble monomers of 5 to 100 mole % of (meth)acryloyloxyethyldimethylbenzylammonium chloride, 0 to 50 mole % of (meth)acryloyloxyethyltrimethylammonium chloride and 0 to 95 mole % of (meth)acylamide in the presence of 1 to 10% by weight of the organic high-molecular multivalent cation comprising the water-soluble polymer of 20 to 100 mole % of (meth)acryloyloxyethyltrimethylammonium chloride and 80 to 0 mole % of (meth)acrylamide based on the total weight of the monomers in a multivalent anionic salt aqueous solution having a concentration of 15% by weight or more.

* * * * *